(12) United States Patent
Watanabe

(10) Patent No.: US 8,225,662 B2
(45) Date of Patent: Jul. 24, 2012

(54) ACCELERATION SENSING DEVICE

(75) Inventor: Jun Watanabe, Hino (JP)

(73) Assignee: Seiko Epson Corporation (JP)

( * ) Notice: Subject to any disclaimer, the term of this patent is extended or adjusted under 35 U.S.C. 154(b) by 545 days.

(21) Appl. No.: 12/416,508

(22) Filed: Apr. 1, 2009

(65) Prior Publication Data

US 2009/0255338 A1 Oct. 15, 2009

(30) Foreign Application Priority Data

Apr. 9, 2008 (JP) ................. 2008-101136

(51) Int. Cl.
*G01P 3/44* (2006.01)
(52) U.S. Cl. .................................. 73/504.16
(58) Field of Classification Search .............. 73/504.12, 73/504.16; 310/370
See application file for complete search history.

(56) References Cited

U.S. PATENT DOCUMENTS

| | | | |
|---|---|---|---|
| 6,065,339 A | 5/2000 | Takeuchi et al. | 73/504.02 |
| 6,244,110 B1 | 6/2001 | Takeuchi et al. | 73/504.12 |
| 6,321,599 B2 | 11/2001 | Takeuchi et al. | 73/504.12 |
| 6,915,694 B2 * | 7/2005 | Tomikawa et al. | 73/504.16 |
| 2010/0116052 A1 * | 5/2010 | Yanagisawa et al. | 73/504.16 |

FOREIGN PATENT DOCUMENTS

| | | | |
|---|---|---|---|
| JP | 11014366 A | * | 1/1999 |
| JP | 2003-214856 | | 7/2003 |
| JP | 2004-085361 | | 3/2004 |
| JP | 2006-064397 | | 3/2006 |
| JP | 2008309731 A | * | 12/2008 |

* cited by examiner

*Primary Examiner* — Hezron E Williams
*Assistant Examiner* — Tamiko Bellamy
(74) *Attorney, Agent, or Firm* — Harness, Dickey & Pierce, P.L.C.

(57) ABSTRACT

An acceleration sensing device includes: an outer frame; a first drive arm having both ends supported by sides of the outer frame through respective base parts, the sides opposing each other; a second drive arm extending from one of the base parts of at least one of the sides toward the other side; and a sensing arm that is disposed midway between the first drive arm and the second drive arm and extends form the one base part of the one side toward the other side, the sensing arm having an electrode in order to extract electric charge generated in the sensing arm. In the device, the first drive arm and the second drive arm have excitation electrodes for a flexural vibration and form a tuning fork type resonator, and center positions in thicknesses of sections that are located in the base parts and on an extension line of the first drive arm differ from a center position in a thickness of the first drive arm.

4 Claims, 5 Drawing Sheets

ACCELERATION SENSING DEVICE

BACKGROUND

1. Technical Field

The present invention relates to an acceleration sensing device, particularly to an acceleration sensing device in which sensitivity in an acceleration detection axis direction is improved and sensitivities in other axis directions are suppressed.

2. Related Art

Acceleration sensors are widely used in various things ranging from automobiles, aircrafts, and rockets to abnormal vibration monitoring units installed in plants and the like. As an acceleration sensor for household appliances, a Micro Electro Mechanical System (MEMS) sensor whose acceleration sensing structure is fabricated by using a semiconductor process technique has been commonly known.

JP-A-2006-64397 is an example of related art. The example discloses an acceleration sensing element. FIG. 5A is a plan view of a known acceleration sensing element 81. The acceleration sensing element 81 has a base part 82, a pair of drive vibrating parts 83, 84 that protrude out from edges of the base part 82 in parallel each other, and a sensing vibrating part 85. The drive vibrating parts 83, 84 and the sensing vibrating part 85 are long and narrow flexural vibrating arms. The drive vibrating part 83 has a pair of grooves 86a, 86b (not shown in the drawing) on its upper and lower faces respectively. An electrode 88 is provided inside and on the sidewall of the grooves 86a, 86b. The electrode 88 is an electrode for exciting the drive vibrating part 83 in such a way indicated by the arrow "A" shown in FIG. 5B. The drive vibrating part 83 includes a strip-shaped main portion and a wide portion 96 at its end part.

The other drive vibrating part 84 has a strip and plate like shape. An electrode 87 is disposed on the surface of the drive vibrating part 84. The electrode 87 is an electrode for exciting the drive vibrating part 84 in such a way indicated by the arrow "A" shown in FIG. 5B. The strip-and-plate shaped sensing vibrating part 85 has a pair of grooves 89a, 89b (not shown in the drawing) on its upper and lower faces respectively. An electrode 90 is provided in the grooves 89a, 89b and on a side wall of the vibration part. The electrode 90 is an electrode through which it is possible to detect vibration of the sensing vibrating part 85 in the direction indicated by the arrow "C" in the drawing.

Referring to FIG. 5B, the drive vibrating parts 83, 84 in the acceleration sensing element 81 vibrate flexuously and in the phase opposite each other as indicated by the arrow "A". Moreover, vibration frequencies of the drive vibrating parts 83, 84 at the time of self-excited oscillation are made the same, which means that an amplitude of the sensing vibrating part 85 disposed at the center becomes zero when no acceleration is applied.

When acceleration is applied to the acceleration sensing element 81 in the direction indicated by the arrow "B" in FIG. 5B, a force is applied to the drive vibrating parts 83, 84 in an X axis direction. The drive vibrating parts 83, 84 thereby extend in the X axis direction and their vibration frequencies both increase. The frequency change (increase) of the drive vibrating part 83 is larger than the frequency change (increase) of the drive vibrating part 84 since the drive vibrating part 83 has the wide portion 96 that holds a large weight at its end. Consequently moments "mα" (m: mass, α: acceleration) of the drive vibrating parts differ each other, and which generates a flexural vibration of the sensing vibrating part 85 in a Y axis direction as denoted by the arrow "C" shown in FIG. 5B. The example describes that an amplitude of the flexural vibration "C" monotonically increases as the acceleration "B" increases and the amplitude is substantially proportional to an output from a detection electrode of the sensing vibrating part 85 thereby it is possible to obtain the acceleration "B".

However the acceleration sensing element disclosed in the example made one of the drive vibrating parts have a larger weight compared to that of the other vibration part in order to unbalance the vibration system. For this reason, it is difficult to realize both a small sized sensing element and to improve the sensitivity.

Moreover the acceleration sensing element disclosed by the example has a disadvantage of sensitivity in an unintended axis. The sensing element of the example has more than one sensible acceleration axis (the X axis direction in FIG. 7) with which the vibration system is unbalanced, thereby acceleration in other direction is also detected when the acceleration is applied to for example the orthogonal direction to the drive vibrating part.

SUMMARY

An advantage of the present invention is to provide a small-sized and highly sensitive acceleration sensing element in which sensitivities of other axes are suppressed.

An acceleration sensing device according to the invention includes: an outer frame; a first drive arm having both ends supported by sides of the outer frame through respective base parts, the sides opposing each other; a second drive arm extending from one of the base parts of at least one of the sides toward the other side; and a sensing arm that is disposed midway between the first drive arm and the second drive arm and extends form the one base part of the one side toward the other side, the sensing arm having an electrode in order to extract electric charge generated in the sensing arm. In the device, the first drive arm and the second drive arm have excitation electrodes for a flexural vibration and form a tuning fork type resonator, and center positions in thicknesses of sections that are located in the base parts and on an extension line of the first drive arm differ from a center position in a thickness of the first drive arm.

According to the invention, the first and second arms are provided and the sensing arm is disposed therebetween, the first and second drive arms are excited to oscillate at the same frequency but in an opposite phase. In this way, no vibration is excited in the sensing arm when no acceleration is applied but a flexural vibration is generated in the sensing arm when acceleration is applied. Consequently electric charge is excited and the value of the applied acceleration can be obtained. Moreover there is another advantage is that the sensitivity detecting acceleration is high because the outer frame is provided and sensitivities in other axes are suppressed.

In this case, both ends of the second drive arm may be supported by the opposing sides of the outer frame through the respective base parts, and center position in thicknesses of sections that are located in the base parts and on an extension line of the second drive arm differ from a center position in a thickness of the second drive arm; and the center positions in the thicknesses of the sections of the first drive arm may differ from the center positions in the thicknesses of the sections of the second drive arm.

When the center positions in the thicknesses of sections of the base parts located on the extension lines of the first and second drive arms differ from the center positions of the drive arms, there is no oscillation is excited in the sensing arm at the time of no acceleration application. But when acceleration is applied, the oscillating system is imbalanced, oscillation is excited in the sensing arm, and it becomes possible to obtain the value of the acceleration from the amount of electric charge. Since the oscillation of the arms is balanced by setting it at an opposite phase, it is possible to increase the detection sensitivity of the acceleration sensing device when acceleration is applied.

In the acceleration sensing device, the outer frame may have a first narrowed section and a second narrowed section, the second narrowed section being disposed at a position remote from the first narrowed section with an opening of the outer frame interposed between the first and the second narrowed sections and in a direction orthogonal to an extended direction of the first drive arm.

By providing the first and second narrowed sections in this way, it is possible to enhance the sensitivity to detect acceleration.

In the acceleration sensing device, the base parts may have a projecting shape being provided to inner edge parts of the opposing sides, both ends of the first and the second drive arms being integrally formed with the respective base part, a base edge part of the sensing arm being integrally formed with the one base part, a first concave section and a second concave section being provided on one face of the base parts, and a third concave section and a fourth concave section being provided on other face of the base parts.

As described above, the first and second drive arms are provided between the base parts of the outer frame. The sensing arm is held at the base part of the one side. The concave sections are provided in the base edge parts and on one face of the first drive arm. The other concave sections are provided in the base edge parts and on the other face of the second drive arm. These concave sections are disposed in the point-symmetrical manner, and the first and second drive arms are excited to oscillate in an opposite phase each other. Thereby oscillation is not generated when no acceleration is applied. When acceleration is applied, the resonance frequency of the first drive arm changes in an opposite way to that of the second drive arm therefore the oscillating system can be efficiently imbalanced. Moreover, it is possible to increase the detection sensitivity of acceleration.

In the acceleration sensing device, the excitation electrodes disposed in the first and second drive arms may be provided such that the first and the second drive arms are both excited in a mode of the flexural vibration but in an opposite phase each other.

In this way, the first and second drive arms are oscillated in an opposite phase each other so that oscillation is not excited in the sensing arm when no acceleration is applied. When acceleration is applied, the oscillating system is imbalanced and oscillation is excited in the sensing arm. As a result, it is possible to obtain the value of the acceleration by utilizing electric charge that is excited by the oscillation of the sensing arm. In addition, frequency of the first drive arm changes in an opposite direction to that of the third drive arm therefore it is possible to determine the direction in which the acceleration is applied.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described.
First Embodiment

Figure 1:
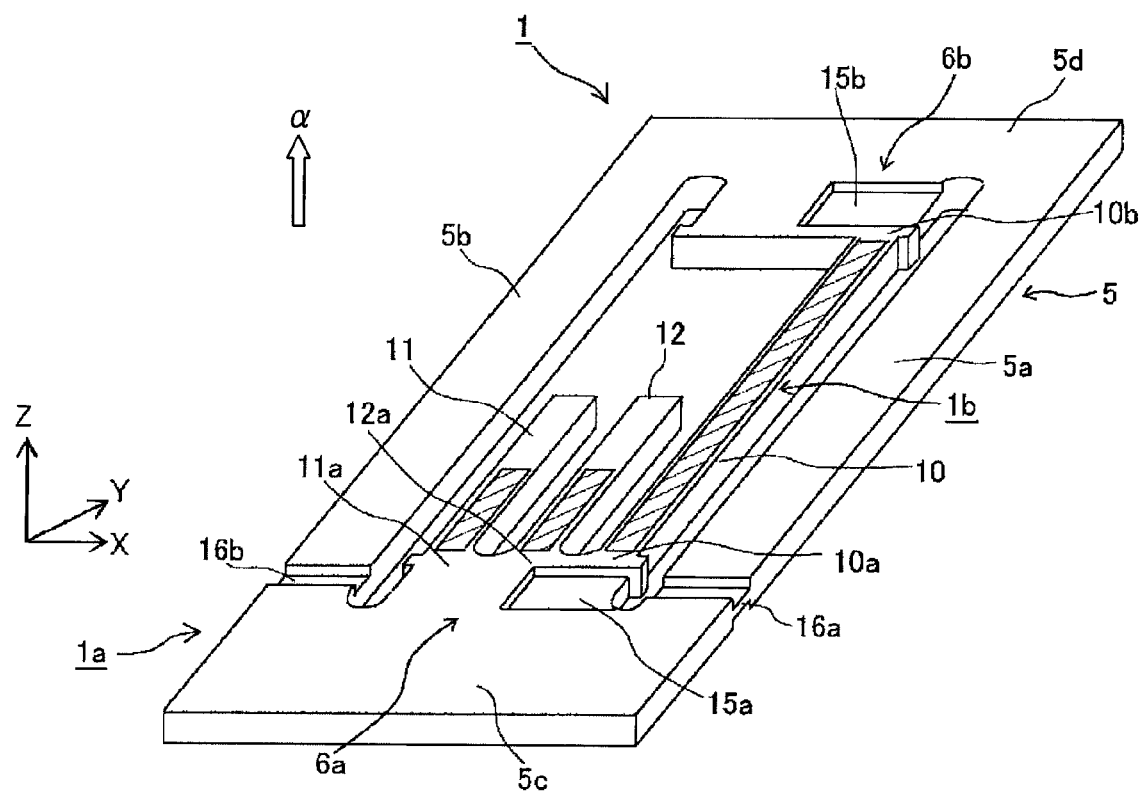
FIG. 1 is a schematic perspective view of an acceleration sensing device according to a first embodiment of the invention showing its structure.

FIG. 1 is a schematic perspective view of an acceleration sensing device 1 according to a first embodiment of the invention showing its structure.

The acceleration sensing device 1 includes a contour vibration body 1a which is a piezoelectric substrate, and an electrode 1b that is provided on the contour vibration body 1a.

The contour vibration body 1a includes an outer frame 5 having a rectangular-frame shape, a first drive arm 10, a second drive arm 11, and a sensing arm 12. The rectangular-frame shaped outer frame 5 has two longer sides 5a, 5b and two shorter sides 5c, 5d.

The contour vibration body 1a has the first drive arm 10 whose both ends are supported by the two opposing shorter sides 5c, 5d (edges) of the rectangular-frame shaped outer frame 5 and that extends in parallel with the longer sides 5a, 5b (edges) of the outer frame 5. The contour vibration body 1a also has the second drive arm 11. The second drive arm 11 has a cantilever structure in which a base edge part 11a of the second drive arm is fixed by a projecting base part 6a disposed at an inner edge of the side 5c and the arm extends toward the shorter side 5d and in parallel with the longer sides 5a, 5b. The contour vibration body 1a further has the sensing arm 12. The sensing arm 12 has a cantilever structure in which a base edge part 12a of the sensing arm is fixed by the base part 6a and the arm extends toward the shorter side 5d (edge) and in parallel with the longer sides 5a, 5b. The contour vibration body 1a further has concave sections 15a, 15b and narrowed sections 15'c, 15'd. The concave sections 15a, 15b are disposed at positions corresponding to the ends (the base parts 6a, 6b) of the first drive arm 10 and in the same plane with the two shorter sides 5c, 5d respectively. The narrowed sections 15'c, 15'd are provided at the opposing two (longer) sides 5a, 5b of the outer frame 5 in a direction perpendicular to the face having the two sides and at the position close to the shorter side 5c so as to oppose each other. The sensing arm 12 is disposed at the middle between the first drive arm 10 and the second drive arm 11.

In other words, the base part 6a, which is integrally formed with and protrudes out from the inner edge of the shorter side 5c, has the concave section 15a in its one face. Base edge parts 10a, 11a of the first and second drive arms 10, 11 and the base edge part 12a of the sensing arm 12 are also integrally formed with the base part 6a. The other base part 6b, which is integrally provided with and protrudes out from the inner edge of the shorter side 5d, has the concave section 15b in a face (the same plane as where the concave section 15a disposed) of the base part 6b. The other base edge part 10b of the first drive arm 10 is integrally formed with the base part 6b. In other words, the two concave sections 15a, 15b are disposed in the same plane of the base parts 6a, 6b and disposed symmetrically to a longitudinal direction of the outer frame 5.

Cross-sectional shapes of the narrowed sections 15'c, 15'd are preferably set to ones that can be easily bent or warped with the fulcrum points of the narrowed sections 15'c, 15'd. Such shape can include for example a rectangular shape as shown in the drawing, a semicircular shape, a hyperbolic shape, a wedge shape and the like.

Figure 2A:
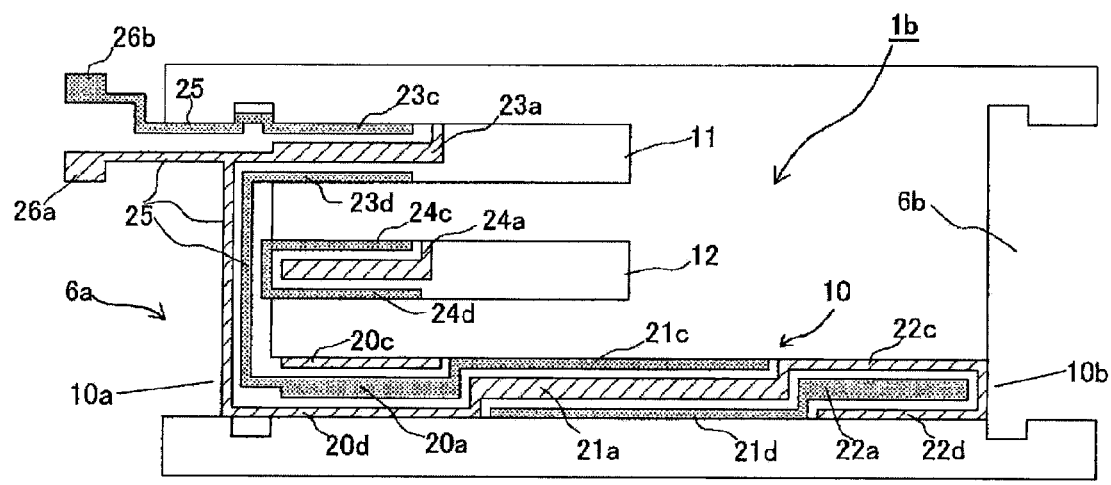
FIG. 2A is a plan view of electrodes of the acceleration sensing device according to the first embodiment.
Figure 2B:
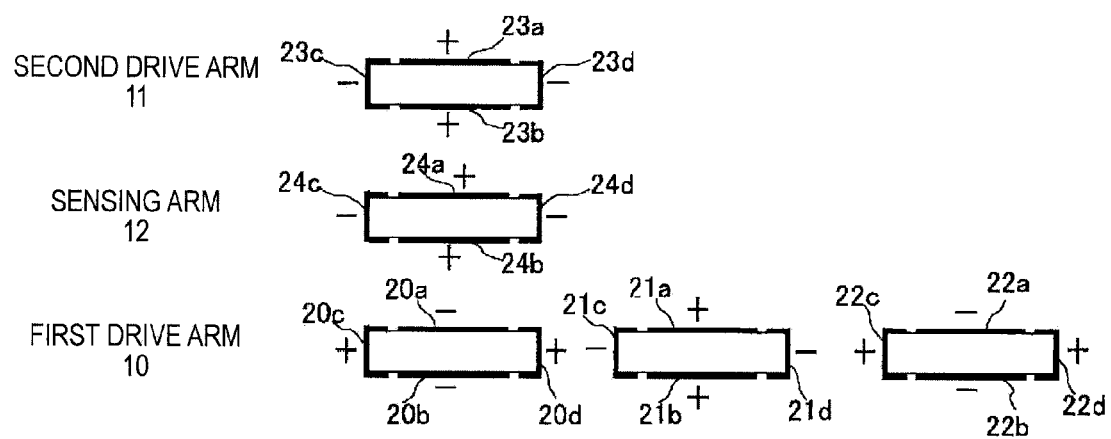
FIG. 2B is a sectional view of the electrodes.

FIG. 2A is a plan view of an electrode provided in the contour vibration body. FIG. 2B is sectional views of the electrodes at various parts illustrating signs of electric charge that is generated at each electrode at some moment. Excitation electrodes 20 (20a to 20d) to 22 (22a to 22d) are provided in the first drive arm 10, and an excitation electrode 23 (23a to 23d) is provided in the second drive arm 11. A flexural vibration with both ends fixed is excited at the first drive arm 10, whereas a flexural vibration with one end fixed is excited at the second drive arm 11. The sensing arm 12 has an electrode 24 (24a to 24d) that picks up electric charge which is generated by an one-end fixed flexural vibration of the sensing arm 12.

The excitation electrodes 20 (20a to 20d), 21 (21a to 21d), 22 (22a to 22d) are sequentially disposed from the base edge part 10a toward the other base edge part 10b on the first drive arm. Each of the electrodes 20a to 22d is coupled by lead electrodes (wiring electrodes) provided on the drive arm 10. The electrodes are coupled through the lead electrodes based on signs of electric charge of the first drive arm 10 shown in FIG. 2B such that the two electrodes with the same sign, in other words, two electrodes with the same positive sign (+) or two electrodes with the same negative (−) sign, are coupled each other so as to form a two-terminal structure. When alternating-current voltage is applied to the two terminals, the both-ends fixed flexural vibration is excited.

Lead electrodes that extend from the first and second drive arms 10, 11 couple the electrodes with the same positive sign (+) or the electrodes with the same negative (−) sign, then the lead electrodes are coupled with terminal electrodes 26a, 26b which are provided on the base part 6a.

The electrode 24 (24a to 24d) is disposed on the sensing arm 12. Each of the electrodes 24a to 24d is coupled with a lead electrode which is provided on the sensing arm 12. The electrodes are coupled through the lead electrode based on signs of electric charge of the sensing arm 12 shown in FIG. 2B such that the two electrodes with the same sign, in other words, two electrodes with the same positive sign (+) or two electrodes with the same negative (−) sign, are coupled each other so as to form a two-terminal structure. The electrodes 24a-24d are provided such that the sensing arm 12 is excited to oscillate in the one-end fixed flexural vibration manner and the electric charge generated by the flexural vibration are picked up by the electrodes.

A case where acceleration a in a thickness direction (Z axis direction) is applied to the acceleration sensing device 1 as shown in FIG. 1 will be now described. Before the acceleration α is applied, the lead electrodes that extend from the excitation electrodes of the first and second drive arm 10, 11 are coupled to unshown oscillation circuits respectively and oscillate (self-excited oscillation) at the same frequency f0. The electrodes 20a to 20d of the first drive arm 10 and the electrodes 23a to 23d of the second drive arm 11 are wired such that an opposite voltage is applied to the corresponding electrodes between the first drive arm and the second drive arm. Thereby a part of the first drive arm 10 close to the base part 6a oscillates in a flexural vibration manner with an opposite phase to the flexural vibration of the second drive arm 11. More specifically, when the part of the first drive arm 10 adjacent to the base part 6a swings to +X axis direction, the second drive arm 11 swings to −X axis direction. These arms oscillate at the same frequency but in the opposite phase so that the distortion in the base part 6a caused by the oscillation distributes symmetrically with respect to a center line extending from the center of the sensing arm 12. Therefore oscillation is balanced in the oscillating system, in other words, in the area including the first and second drive arms 10, 11, the sensing arm 12 and the base part 6a, so that no vibration is excited at the sensing arm 12.

When acceleration $\alpha$ is applied in an acceleration sensing axis direction (the +Z axis direction in FIG. 1), the outer frame 5 is bent (inflected) in −Z axis direction with the narrowed sections 15'c, 15'd which serves as a supporting point and with a free end 5d of the acceleration sensing device 1 which serves as a weight part. Because the concave sections 15a, 15b are provided only on one face (the upper face in FIG. 1) of the base parts 6a, 6b at the both ends of the first drive arm 10, compressive stress works in the first drive arm 10 that is disposed between the concave sections 15a, 15b when inertial force generated by the acceleration $\alpha$ works in the −Z axis direction. As a result, a resonance frequency of the first drive arm 10 decreases. On the contrary, when the acceleration $\alpha$ is applied in the −Z axis direction, in other words, when inertial force works in the +Z axis direction, extensional stress (tensile stress) works in the first drive arm 10 disposed between the concave sections 15a, 15b and the resonance frequency of the first drive arm 10 increases.

On the other hand, the second drive arm 11 is not affected by flexure (bending) of the outer frame 5 caused by the acceleration $\alpha$ therefore the frequency of the second drive arm 11 remains unchanged. Consequently the distortion distribution in the first drive arm 10 and the distortion distribution in the second drive arm 11 caused by the oscillation becomes asymmetrical with respect to the center line. In other words, the oscillating system is imbalanced, the distortion spreads to the sensing arm 12, and the one-end fixed flexural vibration is excited. An amplitude of the one-end fixed flexural vibration monotonically increases depending on the magnitude of the applied acceleration whereas the amount of electric charge excited in the sensing arm 12 is proportional to the amplitude of the flexural vibration. By using these two relations, it is possible to obtain the magnitude of the applied acceleration from the amount of the electric charge that is picked up by the electrodes.

Since the two concave sections 15a, 15b are provided only on one face of the base parts 6a, 6b respectively, the stress that is applied to the first drive arm 10 placed between the concave sections 15a, 15b becomes the compressive stress or the extensional stress (tensile stress) depending on the direction in which the acceleration is applied. This means that the resonance frequency of the first drive arm 10 differs depending on the direction of the applied acceleration. More specifically, a frequency "f0" which is the frequency when no acceleration is applied is changed to "f0+Δf" when the extensional stress is applied to the first drive arm 10 whereas the frequency "f0" is changed to "f0−Δf" when the compressive stress is applied. While the resonance frequency of the second drive 11 is not changed by the acceleration $\alpha$ and stays around f0. The frequency of the oscillation excited in the sensing arm 12 is determined by the dimensional size of the sensing arm 12, and the direction of the acceleration can be detected by utilizing a phase difference from the first drive arm 10.

Second Embodiment

Figure 3:
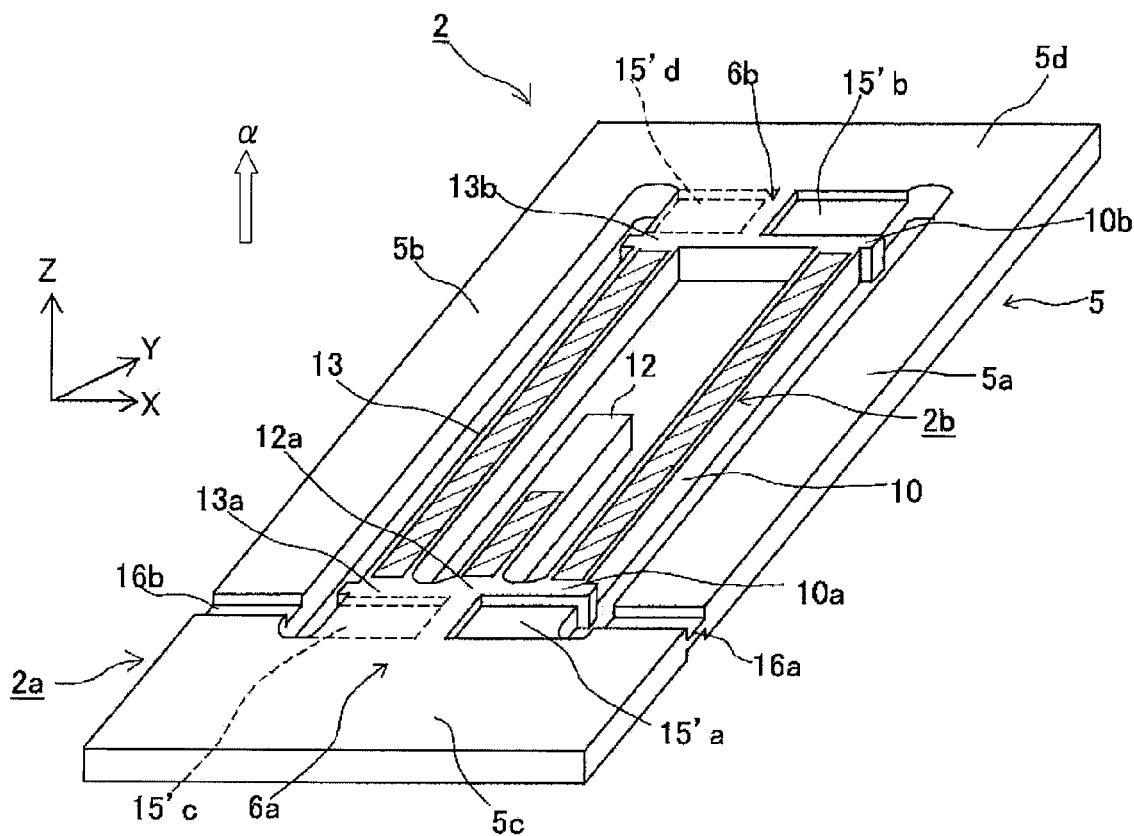
FIG. 3 is a schematic perspective view of an acceleration sensing device according to a second embodiment of the invention showing its structure.

FIG. 3 is a schematic perspective view of an acceleration sensing device 2 according to a second embodiment of the invention showing its structure. The identical numerals are given to the same structures as those of the first embodiment in the following description.

The acceleration sensing device 2 includes a contour vibration body 2a which is a piezoelectric substrate, and an electrode 2b that is provided on the contour vibration body 2a. The contour vibration body 2a includes the outer frame 5 that has a rectangular-frame shape, the first drive arm 10, a third drive arm 13, and the sensing arm 12. The rectangular-frame shaped outer frame 5 consists of the two longer sides 5a, 5b (edges) and the two shorter sides 5c, 5d (edges).

The contour vibration body 2a has the first drive arm 10 and the third drive arm 13 both whose ends are supported by the two opposing shorter sides 5c, 5d (edges) of the rectangular-frame shaped outer frame 5 and that extend in parallel with the longer sides 5a, 5b of the outer frame 5. The contour vibration body 2a further has the sensing arm 12. The sensing arm 12 has a cantilever structure in which the base edge part 12a of the sensing arm is fixed by the shorter side 5c and the arm extends toward the other edge 5d and in parallel with the longer sides 5a, 5b.

The projecting base part 6a which is provided on the inner edge of the shorter side 5c has a first concave section 15'a on its one face (front face side) and a third concave section 15'c on its other face (back face side). The base part 6b that is integrally formed with the inner edge of the shorter side 5d has a second concave section 15'b on its one face (front face side) and a fourth concave section 15'd on its other face (back face side). The third and fourth concave sections 15'c, 15'd and the first and second concave sections 15'a, 15'b are disposed in a point-symmetrical manner respectively.

In other words, the base part 6a supports the base edge parts 10a, 13a of the first and third drive arms 10, 13 so as to form a single body there while it also supports the base edge part 12a of the sensing arm 12. On the other hand, the base part 6b supports the other base edge parts 10b, 13b of the first and third drive arms 10, 13 so as to form a single body.

The first and second concave sections 15'a, 15'b are disposed on the front face of the base parts 6a, 6b respectively and in the positions corresponding to the both ends of the first drive arm 10. The third and fourth concave sections 15'c, 15'd are disposed on the back face of the base parts 6a, 6b respectively and in the positions corresponding to the both ends of the third drive arm 13.

The narrowed sections 15'c, 15'd are provided on the opposing two sides 5a, 5b of the outer frame 5 in a direction perpendicular to the face having the two sides and at the position close to the shorter side 5c so as to oppose each other. The sensing arm 12 is disposed at the middle between the first drive arm 10 and the third drive arm 13.

As for cross-sectional shapes of the narrowed sections 15'c, 15'd, they can be preferably set to a rectangular shape, a semicircular shape, a hyperbolic shape, a wedge shape and the like such that the portion can be easily bent or warped.

Figure 4A:
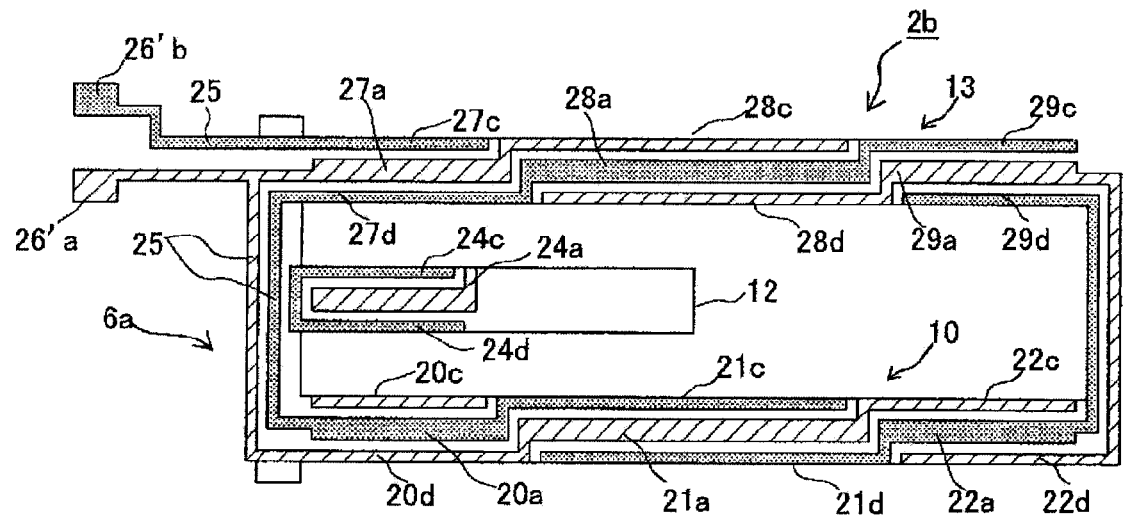
FIG. 4A is a plan view of electrodes of the acceleration sensing device according to the second embodiment.

FIG. 4A is a plan view of the electrode 2b provided in the contour vibration body. FIG. 2B is sectional views of the electrodes at various parts illustrating signs of electric charge that is generated at each electrode at some moment.

Figure 4B:
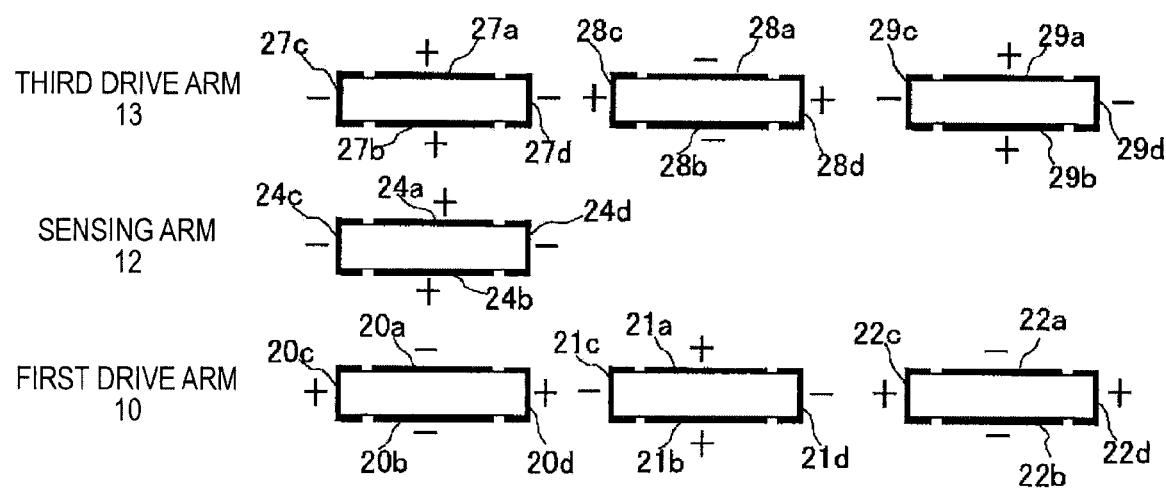
FIG. 4B is a sectional view of the electrodes.
Figure 5A:
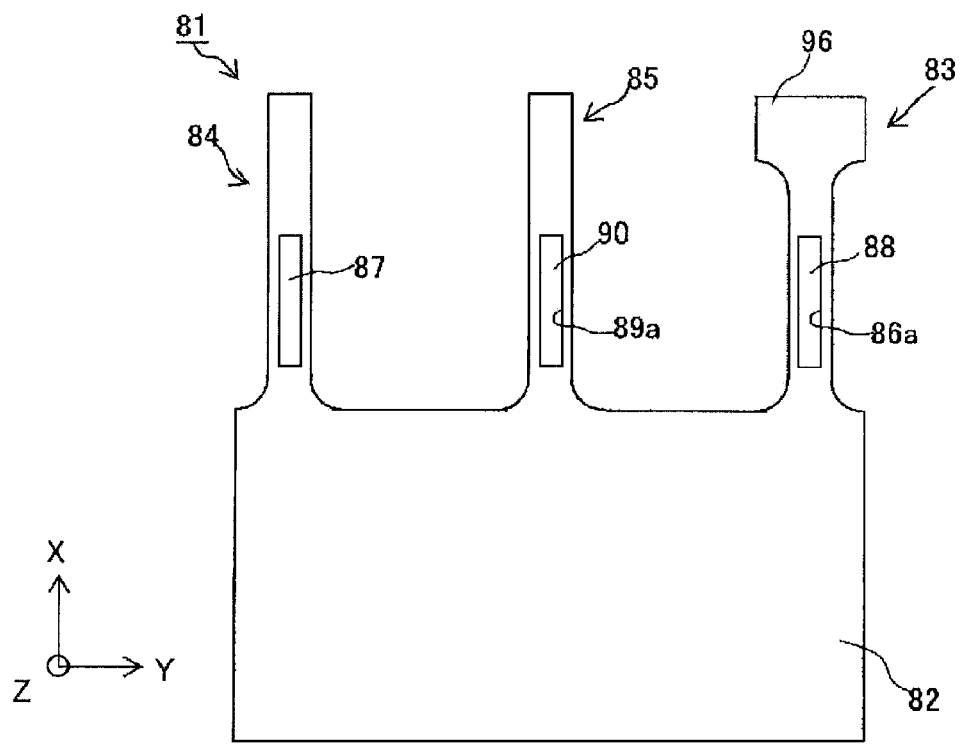
FIG. 5A is a plan view of an acceleration sensing element of the related art.
Figure 5B:
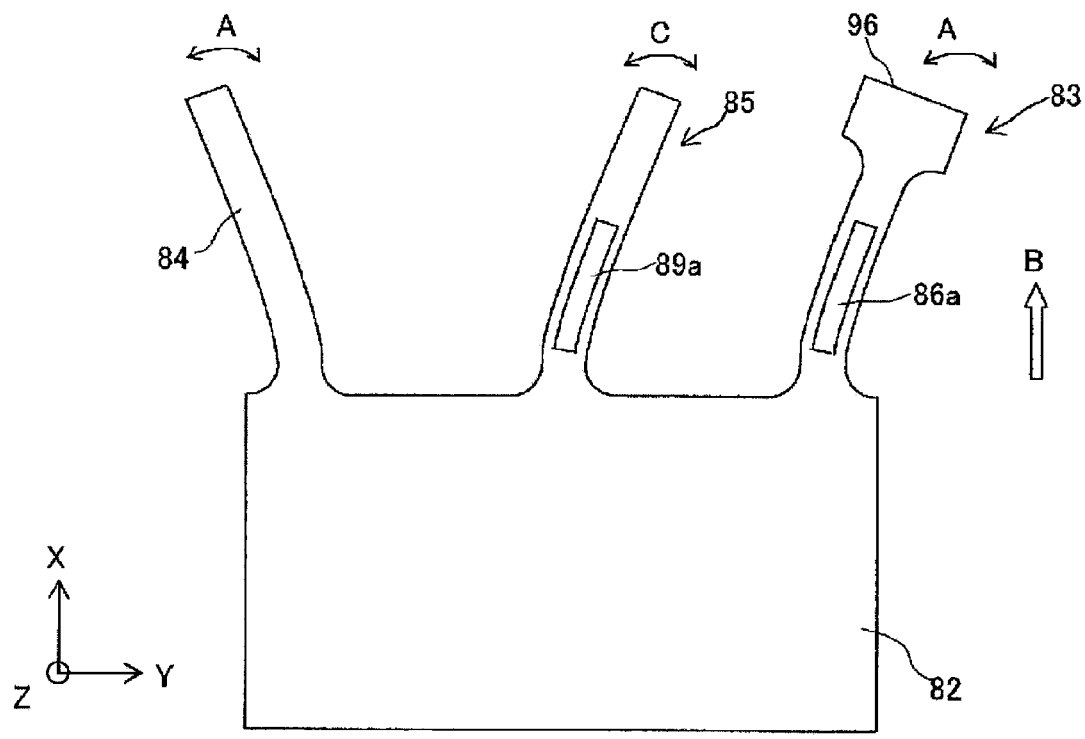
FIG. 5B illustrates a behavior of the acceleration sensing element when acceleration is applied.

Referring to FIG. 4, the excitation electrodes 20 (20a to 20d) to 22 (22a to 22d) are sequentially provided on the first drive arm 10 in the longitudinal direction, and excitation electrodes 27 (27a to 27d) to 29 (29a to 29d) are sequentially provided on the third drive arm 13 in its longitudinal direction in the contour vibration body 2a. A flexural vibration with both ends fixed is excited in the first drive arm 10 and the third drive arm 13. The sensing arm 12 has the electrode 24 (24a to 24d) that picks up electric charge which is generated by the one-end fixed flexural vibration of the sensing arm 12.

Connections of the electrodes provided on the first and third arms 10, 13 and the sensing arm 12 will not be described here since they have been described above with reference to FIG. 2. The first drive arm 10 and the third drive arm 13 oscillate in an opposite phase each other.

A case where acceleration "α" in the thickness direction (the Z axis direction) is applied to the acceleration sensing device 2 will be now described. Before the acceleration α is applied, the lead electrodes that extend from the excitation electrodes of the first and third drive arm 10, 13 are coupled to unshown oscillation circuits respectively and oscillate (self-excited oscillation) at the same frequency f0. The electrodes 20 to 22 of the first drive arm 10 and the electrodes 27 to 29 of the third drive arm 13 are wired such that a voltage with the opposite polarity is applied to the corresponding electrodes between the first drive arm and the third drive arm, thereby the first drive arm 10 and the third drive arm 13 are excited to oscillate in the opposite phase each other in the flexural vibration mode which is the same oscillation mode with a double tuning fork oscillator. These arms oscillate at the same frequency but in the opposite phase so that the distortion in the base part 6a caused by the oscillation of the first and third drive arms 10, 13 distributes symmetrically with respect to the center line that extends from the center of the sensing arm 12. Therefore oscillation is balanced in the oscillating system, in other words, in the area including the first and third drive arms 10, 13, the sensing arm 12 and the base part 6a, so that no vibration is excited at the sensing arm 12.

When acceleration α is applied in an acceleration sensing axis direction (+Z axis direction in FIG. 3) of the acceleration sensing device 2, the outer frame 5 is bent in the −Z axis direction with the narrowed sections 15'c, 15'd which serves as a supporting point and with a free end 5d which serves as a weight part. Because the first and second concave sections 15'a, 15'b are provided on the upper face of the base parts 6a, 6b and in the base edge parts 10a, 10b of the first drive arm 10, compressive stress works in the first drive arm 10 that is disposed between the first and second concave sections 15'a, 15'b when inertial force generated by the acceleration α works in the −Z axis direction. As a result, a resonance frequency of the first drive arm 10 decreases. On the contrary, when the acceleration α is applied in the −Z axis direction, in other words, when inertial force works in the +Z axis direction, extensional stress (tensile stress) works in the first drive arm 10 disposed between the first and second concave sections 15'a, 15'b and the resonance frequency of the first drive arm 10 increases.

Moreover, third and fourth concave sections 15'c, 15'd (not shown in the drawing) are provided on back faces of the base parts 6a, 6b and in the base edge parts 13a, 13b of the third drive arm 13, and extensional stress (tensile stress) works in the third drive arm 10 that is disposed between the third and fourth concave sections 15'c, 15'd when inertial force generated by the acceleration α works in the −Z axis direction. As a result, a resonance frequency of the third drive arm 13 increases. On the contrary, when the acceleration α is applied in the −Z axis direction, in other words, when inertial force works in the +Z axis direction, compressive stress works in the third drive arm 13 that is disposed between the third and fourth concave sections 15'c, 15'd and the resonance frequency of the third drive arm 13 decreases.

Since the resonance frequency of the first drive arm 10 changes in an opposite way to that of the third drive arm 13 when the acceleration α is applied, the distortion distribution in the base part 6a which is caused by the oscillation of the first drive arm 10 and the distortion distribution in the base part 6a which is caused by the oscillation of the third drive arm 13 becomes asymmetrical with respect to the center line extending from the center of the sensing arm 12. In other words, the oscillating system is imbalanced, the distortion spreads to the sensing arm 12, and the one-end fixed flexural vibration is excited. An amplitude of the one-end fixed flexural vibration monotonically increases depending on the magnitude of the acceleration applied whereas the amount of the electric charge excited in the sensing arm 12 is proportional to the amplitude of the flexural vibration. By using these two relations, it is possible to calculate the magnitude of the applied acceleration from the amount of the electric charge that is picked up by the electrode. Since the first and third drive arms 10, 13 oscillate in an opposite phase each other according to this embodiment, the oscillating system is more easily imbalanced by application of the acceleration, therefore the sensitivity for detecting the acceleration is improved compared with the acceleration sensing device 1 of the first embodiment.

The first and second concave sections 15'a, 15'b are disposed on the front face of the base parts 6a, 6b and in the base edge parts 10a, 10b respectively. The third and fourth concave sections 15'c, 15'd are disposed on the back face of the base parts 6a, 6b and in the base edge parts 13a, 13b. These concave sections are disposed in a point-symmetrical manner each other. Thereby a different stress (the compressive stress or the extensional stress) works in the first and third drive arms depending on the direction in which the acceleration α is applied, and frequency change in the arms also differ each other. The oscillation excited in the sensing arm 12 depends on a dimensional size of the sensing arm 12, and a phase difference between the sensing arm 12 and the drive arms 10, 13 depends on the direction of the acceleration. Consequently the value of the acceleration can be obtained from the amount of electric charge in the sensing arm 12, and the direction of the applied acceleration can be detected from the phase.

The acceleration sensing devices 1, 2 according to the first and second embodiments has the outer frame 5 thereby the deformation in the X and Y axis directions is very small. In other words, the sensitivity of the acceleration in the X and Y axis directions (sensitivity of the other axis) is very small.

The piezoelectric substrate is used to form the acceleration sensing devices 1, 2 in the above-described embodiments. A piezoelectric material for the piezoelectric substrate includes crystal, lithium tantalate, lithium niobate, langasite and the like.

Sectional shapes of the first, second and third drive arms can be any shape other than the rectangular shape. For example, it can be an H shape which is adopted for a tuning fork oscillator in order to increase oscillation efficiency.

Moreover, the contour vibration bodies 1a, 2a can be made of metal, glass or the like, and a piezoelectric ceramic material can be jointed so as to form the acceleration sensing device.

According to the embodiments described above, the first and second arms 10, 11 are provided at the base parts 6a, 6b, and the sensing arm 12 is disposed therebetween. The first and second drive arms are excited to oscillate at the same frequency but in an opposite phase thereby no vibration is excited in the sensing arm when no acceleration is applied but a flexural vibration is generated in the sensing arm when acceleration is applied. Consequently electric charge is excited and the value of the applied acceleration can be obtained. An advantage of the embodiments is that the sensitivity detecting acceleration is high because the outer frame 5 is provided and sensitivities in other axes are suppressed.

Moreover, the first and second drive arms 10, 11 and the sensing arm 12 are disposed at the base parts 6a, 6b so as to form a single body there, and the concave sections 15a, 15b are provided at the base edge parts 15a, 15b of the first drive arm. Thereby a compressive stress or an extensional (tensile) stress is efficiently applied to the first drive arm and the detection sensitivity of the acceleration sensing device can be enhanced.

Furthermore, the first and second drive arms 10, 11 are oscillated in an opposite phase each other so that oscillation is not excited in the sensing arm when no acceleration is applied. When acceleration is applied, the oscillating system is imbalanced and oscillation is excited in the sensing arm. As a result, it is possible to obtain the value of the acceleration from electric charge. In addition, there is an advantageous effect that the detection sensitivity at the time when acceleration is applied can be enhanced.

Moreover, the first and third drive arms 10, 13 are provided in a both-ends supported manner between the base parts 6a, 6b of the outer frame 5, the sensing arm 12 is held at the base part 6a in the cantilever manner, the concave section is provided in the base edge parts and on one face of the first drive arm, the other concave section is provided in the base edge parts and on the other face of the third drive arm, these concave sections are disposed in the point-symmetrical manner, and the first and third drive arms are excited to oscillate in an opposite phase each other. Thereby oscillation is not generated when no acceleration is applied. When acceleration is applied, the resonance frequency of the first drive arm changes in an opposite way to that of the third drive arm therefore the oscillating system can be efficiently imbalanced. Moreover, it is possible to increase the detection sensitivity of acceleration.

Moreover, the both ends of the first and third drive arms 10, 13 are held by the base parts 6a, 6b in the both-ends supported manner, the sensing arm 12 is held by the base part 6a in the cantilever manner so as to form a single body there, the concave section is provided in the both base edge parts of the first drive arm and on one face, the other concave section is provided in the both base edge parts of the third drive arm and on the other face. Thereby an opposite stress is applied to the first and second drive arms each other and the oscillating system is imbalanced efficiently. Therefore there is an advantageous effect that the detection sensitivity of the acceleration sensing device can be increased.

Furthermore, the first and second drive arms 10, 11 are oscillated in an opposite phase each other so that oscillation is not excited in the sensing arm when no acceleration is applied. When acceleration is applied, the oscillating system is imbalanced and oscillation is excited in the sensing arm. As a result, it is possible to obtain the value of the acceleration from electric charge that is excited by the oscillation of the sensing arm. In addition, frequency of the first drive arm changes in an opposite direction to that of the third drive arm therefore it is possible to determine the direction in which the acceleration is applied.

What is claimed is:
1. An acceleration sensing device, comprising:
an outer frame;
a first drive arm having both ends supported by sides of the outer frame through respective base parts, the sides opposing each other;
a second drive arm extending from one of the base parts of at least one of the sides toward the other side; and
a sensing arm that is disposed midway between the first drive arm and the second drive arm and extends from the one base part of the one side toward the other side, the sensing arm having an electrode in order to extract electric charge generated in the sensing arm, wherein:

the first drive arm and the second drive arm have excitation electrodes for a flexural vibration and form a tuning fork type resonator; and center positions in thicknesses of sections that are located in the base parts and on an extension line of the first drive arm differ from a center position in a thickness of the first drive arm, the outer frame having a first narrowed section and a second narrowed section, the second narrowed section being disposed at a position remote from the first narrowed section with an opening of the outer frame interposed between the first and the second narrowed sections and in a direction orthogonal to an extended direction of the first drive arm.

2. The acceleration sensing device according to claim 1, wherein:

both ends of the second drive arm are supported by the opposing sides of the outer frame through the respective base parts, and center position in thicknesses of sections that are of the base parts located in the base parts and on an extension line of the second drive arm differ from a center position in a thickness of the second drive arm; and the center positions in the thicknesses of the sections of the first drive arm differ from the center positions in the thicknesses of the sections of the second drive arm.

3. The acceleration sensing device according to claim 1, the base parts having a projecting shape being provided to inner edge parts of the opposing sides, both ends of the first and the second drive arms being integrally formed with the respective base parts, a base edge part of the sensing arm being integrally formed with the one base part, a first concave section and a second concave section being provided on one face of the base parts, and a third concave section and a fourth concave section being provided on other face of the base parts.

4. The acceleration sensing device according to claim 1, the excitation electrodes disposed in the first and second drive arms being provided such that the first and the second drive arms are both excited in a mode of the flexural vibration but in an opposite phase each other.

* * * * *